Figure 1:
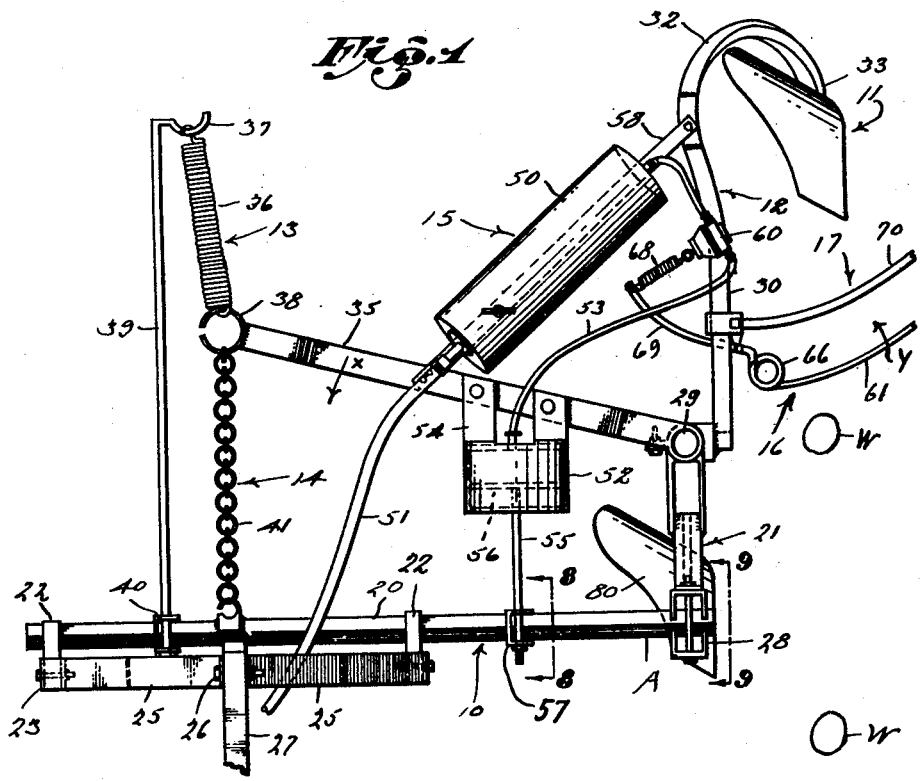

May 25, 1948. W. R. REED ET AL 2,442,095
VINEYARD PLOW
Filed Aug. 19, 1944 3 Sheets-Sheet 1

Inventors
Carl O. Kersey and
Walter R. Reed and
Peter D. Workentine
By W. Alledwell
Attorney

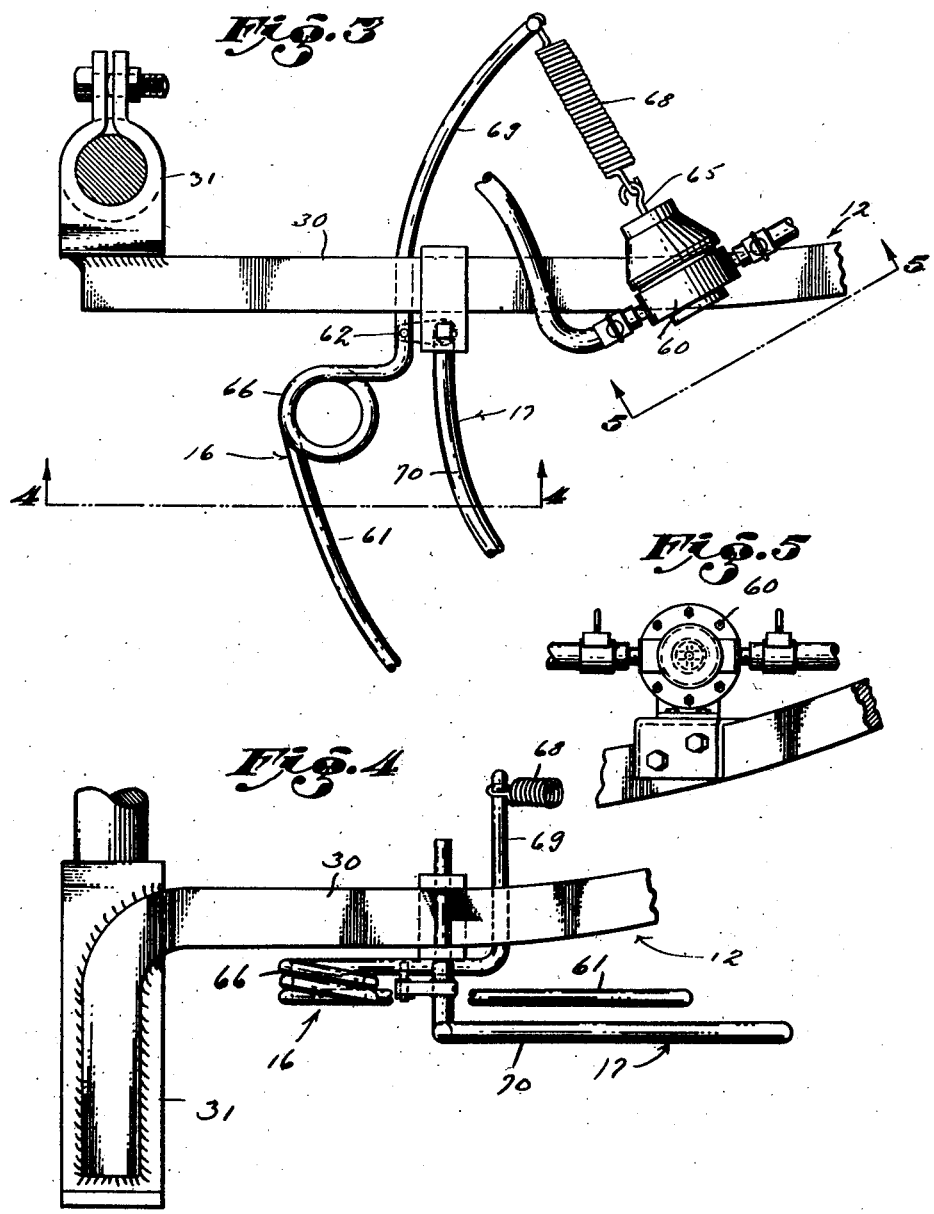

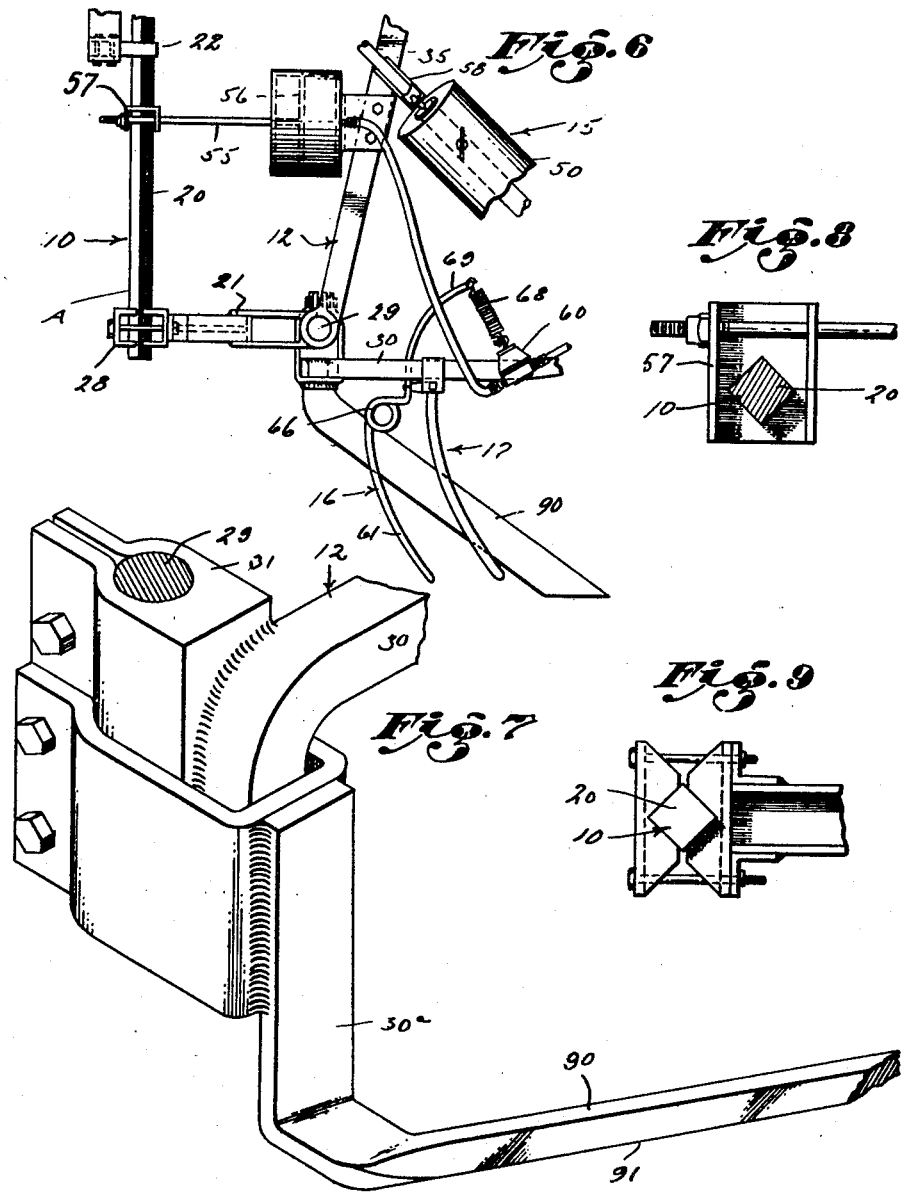

Patented May 25, 1948

2,442,095

UNITED STATES PATENT OFFICE 2,442,095

VINEYARD PLOW

Walter R. Reed, Oildale, Carl O. Kersey, Bakersfield, and Peter D. Warkentine, Reedley, Calif.

Application August 19, 1944, Serial No. 550,224

10 Claims. (Cl. 97—137)

This invention has to do with an agricultural implement and has particular reference to an automatic cultivator, that is, to a cultivator to be drawn by a tractor, or the like, and which will cultivate around vegetation without manipulation by an operator. It is a general object of this invention to provide a simple, practical and improved agricultural implement of the type referred to.

Plantings of most kinds require cultivation and with the equipment that has been available cultivation around trees, vines, bushes, or shrubs has required constant care and control by an operator. As an example, vineyards are usually planted so that the vines are in rows and for proper care the ground around the vines must be plowed at certain intervals. With ordinary equipment a tractor, or the like, can be employed to draw a plow or other implement in the space that is clear between the rows of vines, but in order to get around the vines and to avoid gaps left uncultivated an operator has been necessary to constantly manipulate or direct the plow.

It is a general object of the present invention to provide a plow that can be drawn by an ordinary traction vehicle such as a tractor and which will operate along a row of plantings such as a row of vines, to fully cultivate between the vines and yet not engage the vines in a manner to injure or to interrupt the operation of the plow. With the device of the present invention a plow drawn by a tractor, or the like, can be operated in a line coincidental with a line of vines, or the like, to fully cultivate between the vines and yet will pass around the vines as it comes to them, all without care or attention from an operator.

Another object of our invention is to provide an implement of the general character referred to which is in the form of an attachment readily applicable to an ordinary traction vehicle or tractor and which does not require special, complicated or expensive construction either in the traction vehicle or in the implement itself.

Another object of our invention is to provide an implement of the general character referred to which involves a power unit energized from the power plant of the traction vehicle making it unnecessary to provide the implement with an independent or special prime mover.

Another object of the invention is to provide an implement of the general character referred to which can be readily adapted to various classes of use making it suitable for performing various operations and for use in connection with plantings of various kinds. The device of the present invention can be used in carrying out various cultivating operations by the mere substitution of one form of working element for another. For example the mechanism of the present invention will handle with equal effectiveness and efficiency a plow or a weed scraper, or both simultaneously.

Another object of the invention is to provide an implement of the general character referred to in which the construction is such that various adjustments can be effected as desired to accommodate the implement to the working conditions encountered.

Figure 2:
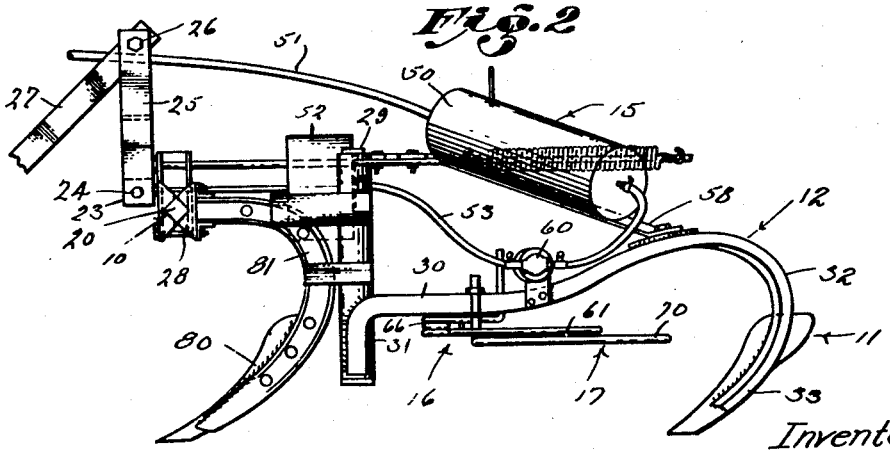

The various objects and features of our invention will be fully understood from the following detailed description of typical preferred forms and applications of the invention, throughout which description reference is made to the accompanying drawings, in which:

Fig. 1 is a plan view of the implement provided by the present invention showing a working element therein in the form of a plow. Fig. 2 is a side elevation of the implement that is shown in Fig. 1. Fig. 3 is an enlarged detailed view showing parts of the control provided by the invention. Fig. 4 is a view of the parts shown in Fig. 3 taken substantially as indicated by line 4—4 on Fig. 3. Fig. 5 is a view taken substantially as indicated by line 5—5 on Fig. 3. Fig. 6 is a plan view similar to a part of Fig. 1 showing an implement of the present invention carrying a weed scraper rather than a plow. Fig. 7 is a perspective view of a part of the mechanism shown in Fig. 6, showing the manner in which the weed scraper is mounted. Fig. 8 is an enlarged detailed sectional view taken as indicated by line 8—8 on Fig. 1, and Fig. 9 is an enlarged detailed sectional view taken as indicated by lines 9—9 on Fig. 1.

The implement provided by our invention is intended to be drawn by means of a suitable traction vehicle, for instance by an ordinary tractor. Since the tractor or traction vehicle as such, is no part of our invention, we have not illustrated such unit in the drawings but have shown only the connections that are made with the tractor. Since the implement that we have provided can be operated by any suitable traction vehicle we do not wish it understood that the implement is limited to use on any particular kind of traction vehicle. However, we will describe it as connected with an ordinary tractor and in referring to a tractor will refer to an ordinary tractor driven by an internal combustion engine, since such units are almost universally used in agricultural work.

The implement of the present invention comprises, generally, a frame 10, a work element 11, means 12 supporting the work element 11 from the frame for movement about a vertical axis, means 13 normally yieldingly holding the parts in position so that the work element is offset laterally to one side of the path of the tractor drawing the implement, means 14 for limiting the outward movement of the work element, power means 15 operable to swing the work element in against the resistance of the means 13, control means 16 for the power means 15, a safety control 17 and various other features and details all of which will be more fully described.

The frame 10 of the implement is provided primarily as a mounting or carrier for various other elements of the implement and it serves as the means or element through which the implement is attached or connected to the tractor. In practice the frame 10 may vary widely in form and construction. However, in its preferred form it involves, generally, a base bar 20, a bearing arm 21 projecting from the base bar, and a brace assembly by which the frame is attached to and braced from the tractor.

The base bar 20 is the main frame element from which the other parts of the implement are supported. In accordance with the preferred form of the invention the bar 20 is a straight, elongate member preferably polygonal in cross sectional configuration and it is attached to the tractor through the structure we will describe, so that it has a projecting end portion A that extends to or possibly beyond the side of the tractor employed for drawing the implement.

In practice any suitable means may be employed to secure the arm to and brace it in proper position from the tractor. In the case illustrated we show two spaced brackets 22 applied to or gripped on the bar 20. The brackets 22 have forwardly projecting yoke portions 23 designed to receive and hold rearwardly projecting parts of the tractor. In the drawings we have indicated pivot pins 24 for coupling the yoke parts 23 of the brackets 22 with parts of the tractor. To brace or stabilize the structure thus far described, that is, to hold the bar 20 in a definite rotative position about its longitudinal axis, we provide arms 25 on the brackets 23 to extend up and inward toward each other from the two brackets to a point where they are joined by a bolt 26 to a brace 27.

The bearing arm 21 is suitably connected to the outer end of the projecting end portion A of bar 20 and projects rearwardly from the bar as shown in Fig. 1 of the drawings. In practice the bearing arm may be fastened to the bar 20 in any suitable manner. In the arrangement illustrated we show a clamp 28 securing the arm 22 to the bar, the clamp being such as to allow the bearing arm to be detached from the arm when desired or to be adjusted along the bar if it is desired to adjust the lateral positioning of the structure carried by the arm 21. The arm 21 projects a suitable distance rearward from the bar 20 and at its outer or projecting end it is made to rotatably support a pivot pin 29. The arm 21 supports the pivot pin so that its axis is perpendicular or vertical, as will be seen in the drawings.

The work element 11 in most cases will be in the form of a plow and, in practice, the particular form, shape, or type of plow may vary, depending upon the conditions encountered or the class of work to be performed. In the drawings we have illustrated a plow of a type generally employed in cultivating vineyards, it being understood, however, that the invention is in no way limited to any particular design or form of work element.

The means 12 supporting the plow from the frame operates to support the plow at a suitable distance from the pivot pin 29 and so that it can be swung about the axis of the pivot pin. The means 12 preferably includes an arm which we will term a plow arm 30 attached at its forward end to a collar 31 fixed on the pivot pin and extending rearward from the collar and then bent into a suitable loop 32 so that its outer end portion 33 extends downward, forward and outward, to support the plow 12 at the proper elevation and so that it faces in the proper direction, as shown in the drawings.

It will be understood that, in practice, the arm used to support any particular work element may be varied in size and shape or as to the disposition of its parts to properly accommodate such work element. In accordance with our invention the bar 20 projects laterally or has the lateral projecting end portion A extended and the various parts thus far described are so arranged and proportioned that when they are in the normal position shown in Fig. 1 of the drawings the plow is offset laterally from the side of the tractor so that it will normally operate in substantial alignment with a row of vines W, or the like, as indicated in Fig. 1, that is, the parts thus far described are arranged and related so that the tractor can be operated parallel to and to one side of a row of vines W so that it in no way interferes with the vines, while the plow being drawn by the tractor operates in a path to turn the soil in line with the row of vines.

The means 13 provided for normally yieldingly holding the plow in the position just described involves, generally, a lever arm 35 fixed to the pivot pin 29 and projecting inwardly therefrom or toward a point directly behind the center of the tractor, and a tension spring 36 coupled between the outer or projecting end of the lever arm 35 and a fixed support 37. In the particular arrangement illustrated the lever arm 35 is fixed to the upper end portion of the pivot pin 29 and normally projects inward and somewhat rearward from the pivot pin as shown in Fig. 1. The outer or projecting end of the lever arm 35 is provided with an eye 38 which carries one end of the spring 36 and it is located in substantial alignment with the central longitudinal axis of the tractor to which the implement is attached.

The spring 36 may be a helical spring of suitable weight and length and the fixed support 37 may be provided through any suitable construction. In the case illustrated the fixed support is in the form of an arm on the outer end of a bracket 39 which projects rearwardly from the bar 20 and which is attached to the bar through a suitable clamp 40. The bracket 39 is of considerable length so that its arm 37 is located a suitable distance rearward of the eye 38 of lever 35 and the spring 36 is proportioned so that it normally yieldingly holds the lever arm 35 in the position shown in Fig. 1, in which case the pivot pin 29 is held in a rotative position so the plow arm 31 is in a position to maintain the plow in the location above described. The spring 36 is made sufficiently strong and heavy to maintain the plow in the position described under normal working conditions. However, because of the pivotal mounting of the plow arm and lever 35 through the pivot pin 29 as the arm 35 is moved or swung forward as indicated by the arrow X in Fig. 1, the arm 30 will be swung in a corresponding manner or inward and thus will cause the plow to move inward or out of line with the vines W.

The means 14 limits the outward pivotal movement of the parts just referred to so that the plow being swung out by the action of the spring 36 will be stopped in the desired lateral position. This means preferably involves a link between the arm 35 and a part of the frame 10. In the construction illustrated a chain 41 is connected to the eye 38 of the lever arm 35 and to the bar 20 of the frame. By attaching various links of the chain to the eye 38 the length of the means 14 can be varied and thus the lateral positioning of the plow can be adjusted.

In accordance with our invention we provide power means for operating the lever arm 35 in the direction indicated by the arrow X so that the plow can be swung in against the resistance of the spring 36 which normaly holds it out. The power means may, in practice, vary widely in form and design or even as to type. However, we prefer to employ a pneumatic means and to energize such means from the tractor which draws the implement. In the preferred form of the invention illustrated throughout the drawings we show a pneumatic means which utilizes a vacuum or reduced pressure generated from tre engine of the tractor. In the case illustrated the operating means 15 involves an accumulator 50 coupled with the engine of the tractor by a suitable line or conduit 51, a diaphragm unit 52 connected between the frame and the lever arm 35, and a connection 53 between the accumulator and the diaphragm unit.

The accumulator is a tank of suitable capacity connected with the suction or intake manifold of the internal combustion engine of the tractor so that as the tractor operates air is withdrawn from the accumulator establishing a negative or reduced pressure therein. In the structural arrangement which we have provided the accumulator 50 is mounted on a brace 58 which extends between the lever arm 35 and the plow arm 30 and thus the accumulator moves as a unit with the lever 35 and the plow. This arrangement necessitates flexible connections 51 and 53.

The diaphragm unit which may be strictly a daiphragm device or a suitable cylinder and piston mechanism, as circumstances require, is coupled between the lever arm 35 and a fixed part of the frame. In the particular case illustrated this unit involves a body fixed to the lever arm 35 by suitable brackets 54 and a connecting rod 55 connecting the diaphragm 56 with the bar 20 of the frame. The connecting bracket 57 which connects the rod 55 with the bar 20 provides for suitable looseness or freedom of movement to accommodate change in angle that occurs when the lever arm moves about the pivotal axis or pin 29.

With the construction and arrangement just described when the accumulator 50 is put in communication with the diaphragm unit through the connection 53 there is a reduced pressure at one side of the diaphragm so that atmospheric pressure on the other side operates the diaphragm causing relative movement between the body in which the diaphragm is carried and the rod 55. This relative movement results in movement of the arm 35 in the direction indicated by the arrow X in Fig. 1.

The control 16 for the power means involves, generally, a suitable control valve 60 in the line 53, a trigger 61 pivotally supported at 62 and a suitable coupling between the trigger and the valve. The valve 60 may, in practice, be any suitable or standard valve which may be connected in the line or connection 53 to establish a continuous passage through the line or to cut off communication with the accumulator and open the diaphragm unit to atmosphere. We are in no way concerned with the details of this valve and, therefore, have not illustrated them in the drawings. The particular valve illustrated is such that when its stem 65 is pulled out communication is established through the line 53 connecting the accumulator and the diaphragm unit.

The trigger 61 is pivotally supported on or from the plow arm 30 at a point removed from the pivotal axis 29 and is shaped and designed so that it normally projects outwardly and somewhat rearwardly at a point spaced a suitable distance ahead of the plow and so that it extends across the path of the plow. Being thus located the trigger 61 is in position to engage an object in the path of the plow before the plow reaches such object. In the particular case illustrated the trigger 61 is in the form of a light rod or heavy wire, and is provided with a coiled portion 66 to give it a certain amount of spring or resilience.

The coupling between the trigger and the valve 60 involves a lever arm 69 connected with the trigger 61 and projecting inward from the pivotal connection 62 and a coiled spring 68 coupling the lever 69 with the stem 65 of the valve. The valve 60 is fixed or supported on the plow arm 30 at a suitable point removed from the pivotal connection 62 of the trigger. With the arrangement and construction just described when the trigger 61 is moved into engagement with an object such as a vine W it will be swung or deflected rearwardly as indicated by the arrow Y in Fig. 1, causing the lever 69 to be swung forward and the stem 65 of the valve to be operated through the spring 68. The loop part 66 of the trigger and the spring 68 allows for over-travel so that the trigger can be moved as far as necessary in the direction indicated by the arrow Y to clear or pass the object which has caused it to be deflected.

The safety control 17 provided by our invention is in the form of a fixed or rigid guard 70 projecting laterally and outwardly from the plow arm 30 across the path of the plow at a point between the trigger 61 and the plow. The guard 70 is rigid and sufficiently strong so that should the other mechanism of the invention fail for any reason the guard will act against an object such as a vine W causing the plow arm to be swung in against the resistance of the spring 36, thus preventing accidental engagement of the plow with the vine W under any circumstances.

From the foregoing description it is believed that the general mode of operation of the implement will be fully understood. In the first place, the implement is mounted on or attached to the tractor so that the bar 20 of frame 10 projects to one side of the tractor in the desired manner, causing the bearing arm 21 to be supported in the desired position. The various parts are formed, proportioned and adjusted so that the plow 11 moves forward in a path to one side of the tractor so that the tractor can be moved straight ahead parallel to a row of vines W while the plow operates in line with the vines W.

As the plow moves forward between adjacent vines it will turn the soil but immediately before it reaches a vine W the trigger 61 will strike the vine. As the trigger strikes the vine and is deflected rearwardly because of the forward motion of the implement the valve 60 is operated, coupling the accumulator 50 with the diaphragm unit. When the power means 15 is thus actuated under the influence of the control 16 the arm 35 is swung forward or in the direction of the arrow X in Fig. 1 causing the plow to swing in or out of the line of the vines, and as the plow swings in the guard 70 which is rigid with the plow arm also is swung in to clear the vine so that the only part of the implement that ever engages the vine is the trigger 61 which is comparatively light and flexible enough so that it does not in any way injure the vine.

When the trigger 61 has passed the vine the valve 60 will return to its normal position and as the air pressures in the diaphragm unit equalize the arm 35 is allowed to swing back to its normal position and by this time the plow has passed the vine W with the result that the implement has moved past the vine without touching it except through the trigger 61. With the implement of the present invention no care or operation is required from an operator. The implement will work entirely automatically and with perfect safety so long as it is properly adjusted and so long as the tractor operator drives the tractor in a path properly related to the line of vines W, or the like.

In conjunction with the apparatus thus far described we may provide other parts or attachments. For instance, in Figs. 1 and 2 of the drawings we show a second or supplemental plow 80 mounted on the outer end portion of the bar 20. The plow 80 is shown carried by a downward extension 81 of the arm 21 so that it moves forward in a path clear of the vines W and does not require any movement or manipulation as the implement is operated.

In Figs. 6 and 7 of the drawings we show a work element in the form of a weed cutter 90, working in conjunction with the plow. In this case there is a downward extension 30ª of the plow arm located at a point close to the pivotal connection or pivotal mounting and a blade-like cutter 90 extends horizontally from the lower end of the extension 30ª. The forward edge 91 of the blade-like cutter is sharpened and the parts are arranged and proportioned so that this blade or cutter works across the surface of the ground in a manner to cut weeds and operates in the path of the plow. The weed cutter will, of course, be moved in when the plow is swung in and thus will clear the vine. The parts can be arranged and related, however, so that the weed cutter works up to a point closer to the vine than does the plow, it being possible to operate the weed cutter closer to the vine than the plow without danger of injury to the vine.

Having described only typical preferred forms and applications of our invention, we do not wish to be limited or restricted to the specific details herein set forth, but wish to reserve to ourselves any variations or modifications that may appear to those skilled in the art and fall within the scope of the claims.

Having described our invention, we claim:

1. An implement of the character described including, a frame applicable to a tractor, an arm pivotally supported from the frame, a work element carried by the arm, means normally yieldingly holding the arm in position where the said element is out of the path of the tractor, pneumatic power means for moving the arm to swing said element inward from said position, and a control for the said power means including a valve and a trigger pivotally supported by the arm and operatively connected to the valve, the trigger normally extending across the path of the said element ahead of said element.

2. An implement of the character described including, a frame applicable to a tractor, an arm pivotally supported from the frame, a work element carried by the arm, means normally yieldingly holding the arm in position where the said element is out of the path of the tractor, pneumatic power means for moving the arm to swing said element inward from said position including an accumulator connected with the tractor, a unit actuated by pressure differential and a connection between the accumulator and said unit, and a control for said power means including a valve in the connection and a trigger operatively connected to the valve and normally extending across the path of said element ahead of the said element.

3. An implement of the character described including, a frame applicable to a tractor, an arm pivotally supported from the frame, a work element carried by the arm, means normally yieldingly holding the arm in position where the said element is out of the path of the tractor, pneumatic power means for moving the arm to swing said element inward from said position including an accumulator connected with the tractor, a unit actuated by pressure differential and a connection between the accumulator and said unit, and a control for said power means including a valve in the connection, a pivotally supported trigger normally extending across the path of the said element, and a yielding connection between the trigger and valve.

4. A unitary implement of the character described including, a frame applicable to a tractor, an arm pivotally supported from the frame on a vertical axis, a work element carried by the arm, means normally yieldingly holding the arm in position where the said element is out of the path of the tractor, power means for moving the arm to swing said element inward from said position including a unit actuated by pressure differential, a valve controlling said unit, and a trigger for operating the valve projecting across the normal path of the element ahead of said element to engage an object in the path of the element and be deflected thereby to work the valve.

5. An implement of the character described including, a frame applicable to a tractor, an arm pivotally supported from the frame, a work element carried by the arm, means normally yieldingly holding the arm in position where the said element is out of the path of the tractor, power means for moving the arm to swing said element inward from said position including a unit actuated by pressure differential, a control valve for said power means, a trigger for operating the valve normally extending across the path of the said element ahead of said element, and a guard fixed relative to said element and projecting from the arm between the trigger and said element.

6. An implement of the character described including, a frame applicable to a tractor, a main arm, a pivotal connection between the arm and the frame, an operating lever rigidly joined to and projecting from the arm, a work element carried by said arm, means normally yieldingly holding said arm in working position where the said element is out of the path of the tractor including a spring cooperating with the lever, a stop engaging the lever limiting movement of the lever by said spring, and power means connected with the lever for moving the arm to swing said element inward from said position.

7. An implement of the character described including, a frame applicable to a tractor, an arm pivotally supported from the frame, a work element carried by the arm, means normally yieldingly holding the arm in position where the said element is out of the path of the tractor and including a lever connected with the arm, pneumatic power means for moving the arm to swing said element inward from said position including an accumulator connected with the tractor and mounted between the arm and lever, a unit actuated by pressure differential and a connection between the accumulator and said unit, and a control for said power means including a valve in the connection and a trigger operatively connected to the valve and normally extending across the path of said element ahead of the said element.

8. An implement of the character described including, a frame to be mounted on a tractor, a plow, a plow arm pivotally carried by the frame and normally supporting the plow offset from the path of the tractor, a lever projecting from the arm, a spring engaging the lever normally yieldingly holding the plow arm in normal position, power means engaging the lever for swinging the plow arm inward from said position including a unit actuated by pressure differential, and a valve controlling said unit, and a control for the valve of the power means including a trigger mounted on a vertical axis normally extending across the path of the plow ahead of the plow.

9. An implement of the character described including, a frame applicable to a tractor and including a bar extending transversely of the tractor, an arm pivotally supported from the bar and extending rearwardly therefrom, a work element carried by the arm, a lever projecting from the arm and spaced rearward from the bar, means normally yieldingly holding the arm in position where the said element is out of the path of the tractor and including a spring connected between the bar and the lever, and power means for moving the arm to swing said element inward from said position including an accumulator mounted between the arm and lever, a conduit for connecting the accumulator with the tractor, a unit actuated by pressure differential and connected with the accumulator and connected between the bar and lever and a control valve between the accumulator and said unit.

10. An implement of the character described including, a frame applicable to a tractor, an arm pivotally supported from the frame, a work element carried by the arm, means normally yieldingly holding the arm in position where the said element is out of the path of the tractor, pneumatic power means for moving the arm to swing said element inward from said position, and a control for the said power means including a valve and a pivotally mounted trigger pivotally operatively connected to the valve, the trigger normally extending across the path of the said element ahead of said element.

W. R. REED.
CARL O. KERSEY.
PETER D. WARKENTINE.

REFERENCES CITED

The following references are of record in the file of this patent:

UNITED STATES PATENTS

| Number | Name | Date |
|---|---|---|
| 1,307,672 | Johnson | June 24, 1919 |
| 1,570,415 | Sumbulian | Jan. 19, 1926 |
| 2,253,130 | Lund | Aug. 19, 1941 |

FOREIGN PATENTS

| Number | Country | Date |
|---|---|---|
| 124,089 | Switzerland | Jan. 2, 1928 |
| 428,937 | France | July 3, 1911 |
| 431,987 | France | Sept. 25, 1911 |
| 564,908 | France | Oct. 31, 1923 |